No. 652,462. Patented June 26, 1900.
J. A. KESSLER.
SHIP'S BULKHEAD DOOR.
(Application filed Sept. 19, 1899.)

(No Model.)

Witnesses
E. C. Wunderman
S. J. Williamson

Inventor
John. A. Kessler
by Geo. C. Hazelton
Atty

UNITED STATES PATENT OFFICE.

JOHN A. KESSLER, OF PHILADELPHIA, PENNSYLVANIA.

SHIP'S BULKHEAD-DOOR.

SPECIFICATION forming part of Letters Patent No. 652,462, dated June 26, 1900.

Application filed September 19, 1899. Serial No. 730,999. (No model.)

*To all whom it may concern:*

Be it known that I, JOHN A. KESSLER, a citizen of the United States, residing at Philadelphia, in the county of Philadelphia and State of Pennsylvania, have invented a certain new and useful Improvement in Ships' Doors, of which the following is a specification.

My invention relates to a new and useful improvement in ships' doors, and has for its object to provide an exceedingly simple and effective door and fastenings therefor which will permit the door to be closed and bolted at a number of points by the operation of a single lever, while such bolting will force the door inward, causing its flanges to embed themselves in a compressible packing.

In order that those skilled in the art to which this invention appertains may understand how to make and use the same, the construction and operation will now be described in detail, referring to the accompanying drawings, forming a part of this specification, in which—

Figure 1:
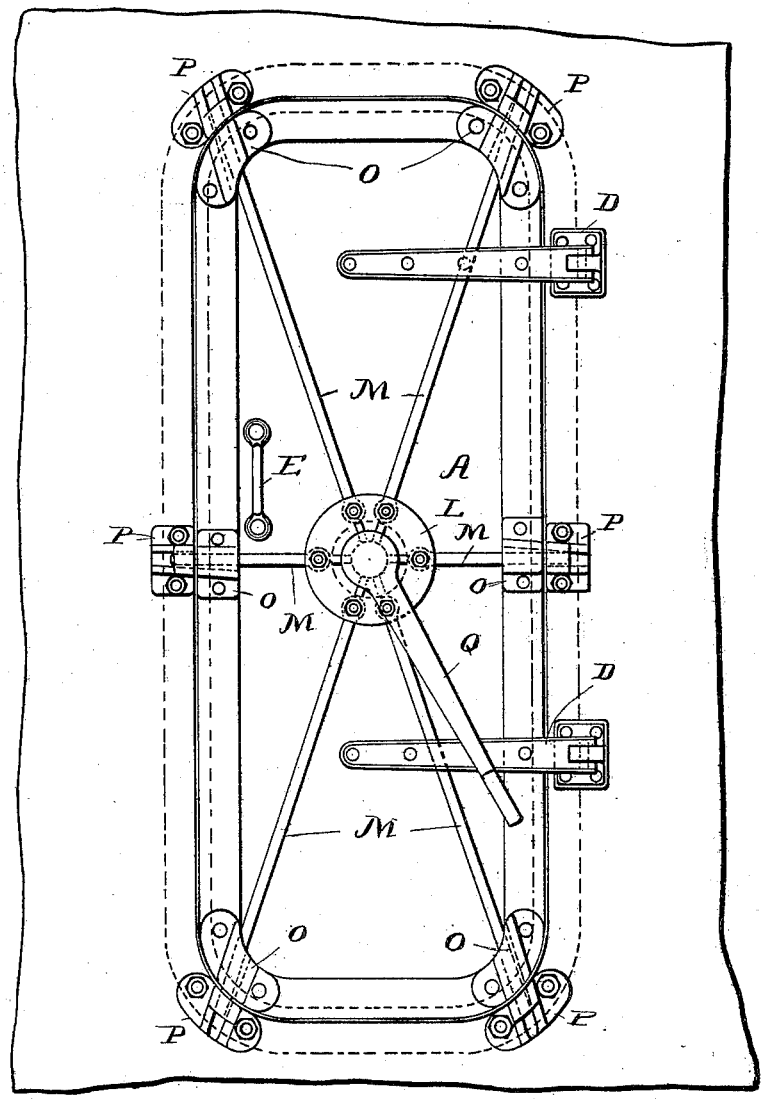
Figure 2:
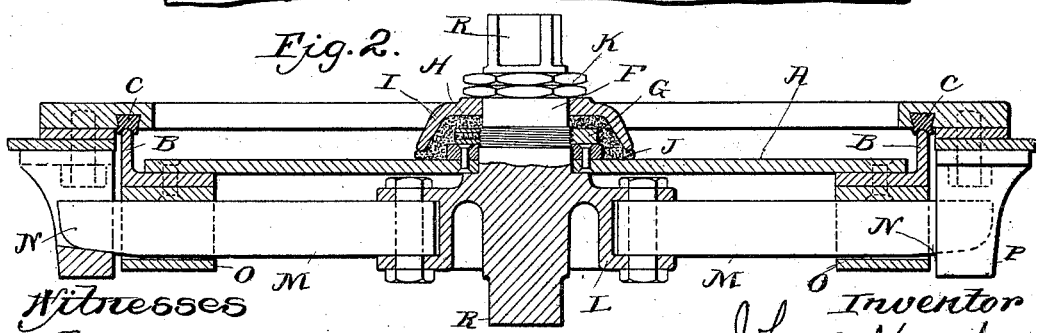

Figure 1 is an elevation of a door made in accordance with my improvement, showing the bolts arranged to be operated by a single lever; and Fig. 2, a central cross-section illustrating the arrangement of two of the bolts and fastenings therefor.

In carrying out my invention as here embodied, A represents the door, which has secured thereto the flange B, the latter extending entirely around the edge thereof, its outer edges being adapted to bear against and partly compress the elastic packing C, said packing being set in the outer casing to correspond with this flange. The door is hung upon the hinges D in the usual manner and is provided with the handle E, whereby it may be readily swung to and fro. A stud F is pivoted in the center of the door and held in place by the ring-nut G, which latter is prevented from backing off by the set-screw H. A packing-cap I is fitted over one end of the stud and serves to inclose the packing material J, and this cap is held in place by the nuts K. The object of the packing J is to prevent leakage of water or gas around the stud, as will be readily understood. The stud has formed therewith the grooved disk L, in which are pivoted the bolt-rods M. These rods radiate from the ring and terminate in wedge-shaped bolts N, guided by the housings O, secured upon the door. A series of brackets P is secured upon the door-casing to correspond with the housings O, so that when the door is closed each of the bolts will register with one of these brackets, and as the latter is staple-shaped it follows that when the bolts are shot outward they will pass into the brackets, and as each bolt is wedge-shaped upon its outer edge it will act as a cam upon the inner wall of the bracket, and thereby force the door inward with sufficient pressure to cause the flange B to partially embed itself in the elastic packing C, as before set forth. This, as is obvious, will make a perfectly water, air, and gas tight joint and prevent any possibility of leakage around the door. The shooting of the bolts is accomplished by the turning of the disk L, to which the bolt-rods are pivoted, said disk acting as one member of a toggle and each of the bolts acting as the other member, so that when the pivot-point of each bolt has passed to the opposite side of the center of the disk the bolts will be held against retraction, as is well understood, and yet when it is desired to retract the bolts this is accomplished by simply turning the disk in the reverse direction, which by the same movement will unlock and retract said bolts, it being noted that sufficient play is provided in each of the housings and in the brackets to permit the lateral swinging of the bolts occasioned by the turning of the disk to operate the same. The revolving of the disk to produce the results just described is accomplished by the key-lever Q, which is adapted to fit upon either end of the stud F, these ends being squared, as indicated at R, or otherwise formed for that purpose.

Having thus fully described my invention, what I claim as new and useful is—

1. In combination, a door-casing, a series of brackets secured to said casing, a door hinged to the casing and adapted to close the opening therethrough, a stud pivoted within the door, a grooved disk carried by the stud, a series of bolt-rods pivoted within the disk terminating in wedge-shaped bolts, the relative arrangement being such that the pivots of the bolts pass beyond the centers of the disks in the direction which they move for locking, a series of housings secured to the door and adapted to act as guides for the bolts, and a lever for operating the disk whereby all of the bolts will be caused to move in unison for locking or unlocking the door, as specified.

2. In combination with a door, a series of brackets secured to the door-casing, a threaded stud centrally of the door, a ring-nut engaging the threads of the stud, a packing-cap suitably secured about the stud, a grooved disk formed with the stud on one side of the door, bolt-rods pivoted in the grooves of the disk and means for rotating the stud.

In testimony whereof I have hereunto affixed my signature in the presence of two subscribing witnesses.

JOHN A. KESSLER.

Witnesses:
WM. D. NEES,
E. A. STOUT, Jr.